United States Patent
Lee (10) Patent No.: US 9,753,933 B2
(45) Date of Patent: Sep. 5, 2017

(54) ELECTRONIC DEVICE AND METHOD FOR MOUNTING FILE SYSTEM USING VIRTUAL BLOCK DEVICE

(71) Applicant: Samsung Electronics Co., Ltd., Gyeonggi-do (KR)

(72) Inventor: Woo-Joong Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 184 days.

(21) Appl. No.: 14/300,553

(22) Filed: Jun. 10, 2014

(65) Prior Publication Data

US 2014/0372676 A1    Dec. 18, 2014

(30) Foreign Application Priority Data

Jun. 14, 2013 (KR) .................. 10-2013-0068613

(51) Int. Cl.
*G06F 17/30* (2006.01)
*G06F 12/02* (2006.01)
*G06F 9/44* (2006.01)

(52) U.S. Cl.
CPC ...... *G06F 17/30091* (2013.01); *G06F 9/4411* (2013.01); *G06F 12/0246* (2013.01); *G06F 17/30575* (2013.01); *G06F 2212/7202* (2013.01)

(58) Field of Classification Search
CPC ......... G06F 17/30091; G06F 17/30575; G06F 12/0246; G06F 9/4411; G06F 2212/7202; G06F 21/575; G06F 2201/815; G06F 2212/7203; G06F 11/1417; G06F 17/30233; G06F 17/30067; G06F 21/10; G06F 21/78; G06F 21/79; G06F 2221/0737; G06F 2221/2137; G06F 3/064; G06F 3/0679; G06F 3/061; G06F 3/0652; G06F 11/1435; G06F 3/0607; G06F 3/0643; G11C 16/22; G11C 16/102
See application file for complete search history.

(56) References Cited

U.S. PATENT DOCUMENTS

| | | | |
|---|---|---|---|
| 5,579,517 A | 11/1996 | Reynolds et al. | |
| 5,758,352 A | 5/1998 | Reynolds et al. | |
| 7,120,909 B1 * | 10/2006 | Shibuya | G06F 8/60 455/419 |
| 7,457,910 B2 * | 11/2008 | Chang | G06F 3/0608 711/103 |
| 2004/0186971 A1 * | 9/2004 | Meharchand | G06F 21/78 711/163 |

(Continued)

OTHER PUBLICATIONS

Lee, et al.; "A Hybrid Flash File System Based on NOR and NAND Flash Memories for Embedded Devices"; IEEE Transactions on Computers; Jul. 2008; vol. 57 No. 7; IEEE Computer Society.

(Continued)

*Primary Examiner* — Zhuo Li
(74) *Attorney, Agent, or Firm* — Cha & Reiter, LLC (57) ABSTRACT

A method is provided including: generating a virtual block device including a file allocation table area located in an internal storage of an electronic device, and a cluster heap area located in a memory card that is inserted in the electronic device; and mounting a file system of the memory card using the generated virtual block device.

18 Claims, 9 Drawing Sheets

(56) References Cited

U.S. PATENT DOCUMENTS

| | | | |
|---|---|---|---|
| 2004/0250172 A1* | 12/2004 | Patel | G06F 11/1435 |
| | | | 714/42 |
| 2005/0080985 A1* | 4/2005 | Sasaki | G06F 3/0607 |
| | | | 711/103 |
| 2007/0002612 A1* | 1/2007 | Chang | G06F 3/0608 |
| | | | 365/185.01 |
| 2009/0164440 A1 | 6/2009 | Pudipeddi et al. | |
| 2010/0077012 A1* | 3/2010 | Yogev | G06F 12/0238 |
| | | | 707/822 |
| 2016/0029204 A1* | 1/2016 | Lalwaney | H04W 8/22 |
| | | | 455/418 |

OTHER PUBLICATIONS

Hardware White Paper. Microsoft Extensible Firmware Initiative FAT32 File System Specification, FAT: General Overview of On-Disk Format. Version 1.03, Dec. 6, 2000, pp. 1-34, Microsoft Corporation.
European Search Report dated Sep. 1, 2016.

* cited by examiner

ELECTRONIC DEVICE AND METHOD FOR MOUNTING FILE SYSTEM USING VIRTUAL BLOCK DEVICE

CLAIM OF PRIORITY

This application claims priority under 35 U.S.C. §119 to an application filed in the Korean Intellectual Property Office on Jun. 14, 2013 and assigned Serial No. 10-2013-0068613, the contents of which are incorporated herein by reference.

BACKGROUND

1. Field of the Disclosure

The present disclosure relates to an electronic device and method for mounting a file system using a virtual block device.

2. Description of the Related Art

A memory card may be inserted into an electronic device to extend the storage area of the electronic device and to exchange data with another electronic device. However, memory cards in general have a lower input/output performance and a shorter lifetime, compared to the internal storage generally included in electronic devices. Therefore, the need exists for new techniques for improving input/output performance and the lifetime of memory cards.

SUMMARY

The present disclosure addresses this need. According to one aspect of the disclosure, a method comprising: generating a virtual block device including a file allocation table area located in an internal storage of an electronic device, and a cluster heap area located in a memory card that is inserted in the electronic device; and mounting a file system of the memory card using the generated virtual block device.

According to another aspect of the disclosure, an electronic device comprising an internal storage and a processing circuitry configured to: generate a virtual block device including a file allocation table area located in the internal storage, and a cluster heap area located in a memory card that is inserted in the electronic device; and mount a file system of the memory card using the generated virtual block device.

BRIEF DESCRIPTION OF THE DRAWINGS

The above features and advantages of the present disclosure will become more apparent from the following detailed description when taken in conjunction with the accompanying drawings in which.

DETAILED DESCRIPTION

Aspects of the present disclosure will be described herein below with reference to the accompanying drawings. In the following description, detailed descriptions of well-known functions or configurations will be omitted since they would unnecessarily obscure the subject matter of the present disclosure. Also, the terms used herein are defined according to the functions of the present disclosure. Thus, the terms may vary depending on users' or operators' intentions or practices. Therefore, the terms used herein must be understood based on the descriptions made herein.

Figure 1A:
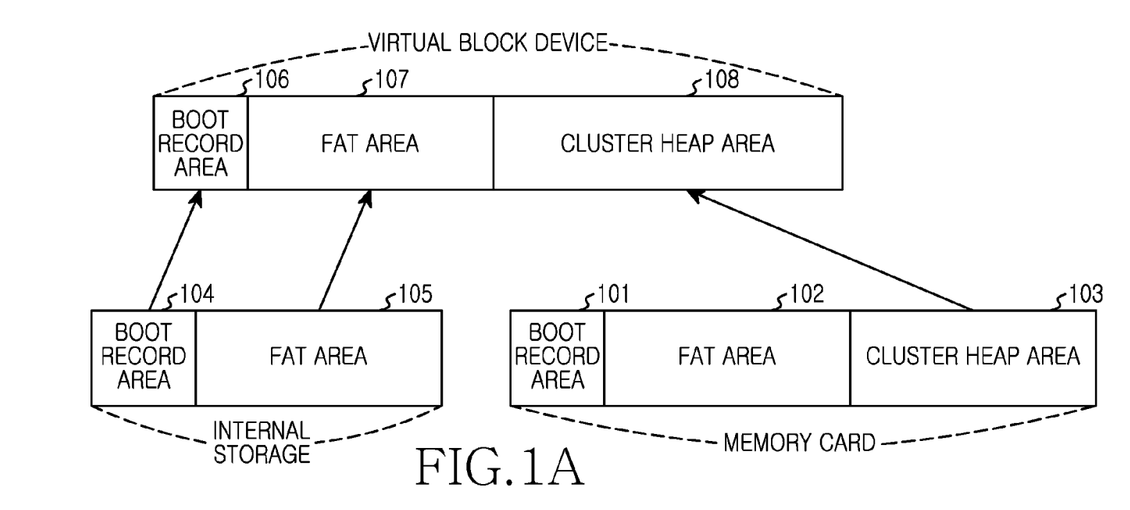
FIG. 1A and FIG. 1B are diagrams illustrating an example of a technique for generating a virtual block device and mounting a File Allocation Table (FAT) file system, according to aspects of the present disclosure the present disclosure.
Figure 1B:
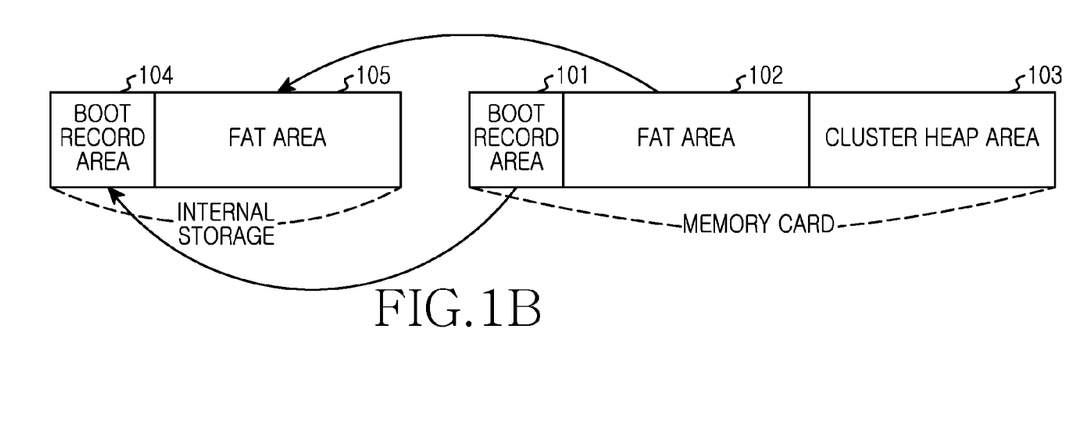

FIGS. 1A and 1B are diagrams illustrating an example of a technique for generating a virtual block device and mounting a File Allocation Table (FAT) file system, according to aspects of the present disclosure. Referring to FIG. 1A, a virtual block device according to the present disclosure may include a memory card capable of being inserted to an electronic device and an internal storage included in the electronic device. Herein, the FAT file system may be defined as a system that may read and write data on a per-file basis and a per-directory basis.

First, the memory card may be inserted into a slot included in the electronic device and be used to extend the storage area of the electronic device and to exchange data with another electronic device. Examples of the memory card may include a multimedia card, a Secure Digital (SD) card, a compact flash card, a micro drive, a memory stick), a smart media card, an extreme digital (xD) picture card, and/or any other suitable type of card.

The memory card may include a boot record area 101, a FAT area 102, and a cluster heap area 103. In this example, the boot record area 101 refers to an area in which machine codes for booting the electronic device and various setting values of the FAT file system are included. In addition, the FAT area 102 is the meta-data area of the file system for storing a table for managing cluster allocation information and a cluster chain. Based on the FAT area 102, it may be determined which cluster is empty or which file is coupled to a cluster. In addition, the cluster heap area 103 is an area in which data clusters are stored.

The internal storage may include a boot record area 104 and a FAT area 105 as storage areas included in the electronic device. For example, the boot record area 104 may be an area to which the boot record area 101 of the memory card is copied. The boot record area 104 may include a backup boot record obtained when the boot record of the memory card is backed up. In addition, the FAT area 105 may be an area to which the FAT area 102 of the memory card is copied, and the FAT area 105 may include the FAT table of the file system stored in the FAT area 102 of the memory card. That is, the boot record area 104 and FAT area 105 of the internal storage included in the electronic device are obtained by copying the boot record area 101 and FAT area 102 of the memory card, and the functions thereof are identical respectively to those of the boot record area 101 and FAT area 102 of the memory card.

The virtual block device may include a boot record area 106, a FAT area 107, and a cluster heap area 108. The boot record area 106 and FAT area 107 may be areas which have been synchronized with the boot record area 104 and FAT area 105 of the internal storage respectively, and the cluster heap area 108 of the virtual device may be an area which has been synchronized with the cluster heap area 103 of the memory card. Thus, the boot record area 106 and FAT area 107 of the virtual block device may operate under the control of the internal storage included in the electronic device. An example of mounting a FAT file system using the virtual block device in an electronic device will be described in detail below.

First, the electronic device may identify that the memory card is inserted into the slot. In some instances, the electronic device may include one or more slots into which the memory card may be inserted to enable the insertion of a plurality of memory cards.

Thereafter, the electronic device may determine whether the backup boot record is stored in the boot record area 104 of the internal storage. Specifically, the electronic device may determine whether the boot record of the memory card is backed up in the boot record area 104 of the internal storage. When the memory card is inserted into the predetermined slot of the electronic device, the electronic device backs up the boot record 101 of the inserted memory card to store the backup boot record in the boot record area 104 of the internal storage of the electronic device.

When the electronic device determines that the backup boot record is stored in the boot record area 104 of the internal storage, the electronic device may determine whether the backup boot record is identical to the boot record stored in the boot record area 101 of the memory card. Specifically, the electronic device may determine whether the backup boot record is identical to the boot record stored in the boot record area 101 of the memory card.

When the electronic device determines that the backup boot record is identical to the boot record stored in the boot record area 101 of the memory card, the electronic device generates a virtual block device including the boot record area 104 and FAT area 105 of the internal storage and the cluster heap area 103 of the inserted memory card. Specifically, the boot record area 106 and FAT area 107 of the virtual device may be areas which have been synchronized with the boot record area 104 and FAT area 105 of the internal storage respectively, and the cluster heap area 108 of the virtual device may be an area which has been synchronized with the cluster heap area 103 of the memory card.

Thereafter, the electronic device may mount a FAT file system using the generated virtual block device. That is, the boot record area 106 and FAT area 107 of the virtual block device may operate under the control of the internal storage included in the electronic device. Thereafter, a FAT file system may be managed in which the FAT area 107 of the generated virtual block device reads data from the cluster heap area 108 of the virtual block device and stores data in the cluster heap area 108.

However, when the backup boot record is not stored in the boot record area 104 of the internal storage included in the electronic device or the backup boot record is not identical to the boot record stored in the boot record area 101 of the memory card even through the backup boot record is stored, the virtual block device may be generated through a process which will be described below.

First, the electronic device may determine whether an instruction for performing a fast mode is received. For example, the fast mode may be a mode for executing the FAT file system using the generated virtual block device. Operating the memory card in fast mode may help improve the input/output performance of the memory card.

Thereafter, when the electronic device receives the instruction for executing the fast mode, the electronic device may copy a boot record stored in the boot record area 101 of the memory card and a FAT table stored in the FAT area 102 to the internal storage respectively. That is, as illustrated in FIG. 1B, the electronic device may copy the boot record stored in the boot record area of the memory card to the boot record area of the internal storage. In addition, the electronic device may copy the FAT table stored in the FAT area 102 of the memory card to the FAT area of the internal storage. Thereafter, the electronic device may mount the FAT file system using the generated virtual block device as described in detail below with reference to FIG. 1A.

When a memory card is inserted into an existing electronic device and the existing electronic device executes a FAT file system, the FAT area 102 of the memory card reads data from the cluster heap area 103 or stores data in the cluster heap area 103. However, an external memory card using a TLC (Triple Level Cell) NAND has lower input/output performance than an internal memory card, such as an eMMC (embedded Multi Media Card) using SLC (Single Level Cell) or MLC (Multi Level Cell). In particular, the random write performance thereof is one-fifth to twentieth as compared to that of the internal storage, and therefore, the external memory card is very inefficient.

However, the electronic device according to the present disclosure generates the virtual block device and mounts the FAT file system, thereby resolving the above problem. Specifically, in the electronic device, according to aspects of the present disclosure, reading and changing of the file cluster chain may be performed through input/output to/from the internal storage, and file data is processed through the memory card, thereby reducing the number of random inputs/outputs of the memory card. That is, since a high-performance internal storage performs reading and changing of the file cluster chain, input/output performance may be improved compared to a method for managing a FAT file system in a memory card according to the related art. The internal storage having excellent lifetime processes random write generated in the memory card, thereby improving the lifetime of the memory card.

Figure 2A:
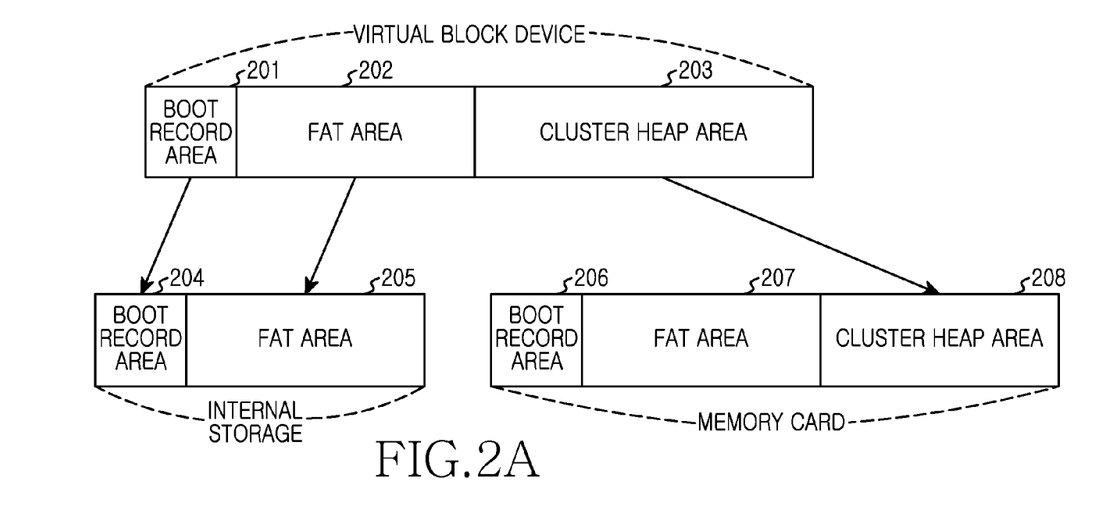
FIG. 2A and FIG. 2B are diagrams illustrating an example of in which a FAT file system using a virtual block device is un-mounted, according to aspects of the present disclosure.
Figure 2B:
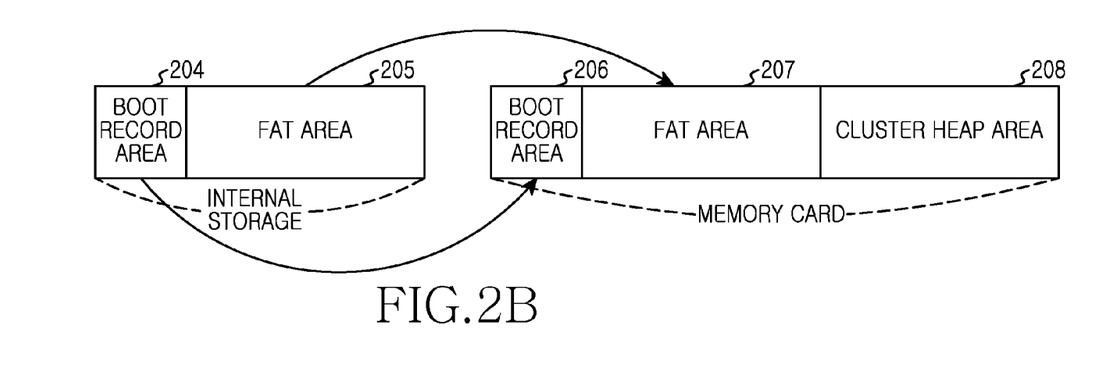

FIGS. 2A and 2B are diagrams illustrating an example in which a FAT file system using a virtual block device is un-mounted according to aspects of the present disclosure. First, an electronic device may receive an instruction for safely removing an inserted memory card. Specifically, the electronic device may receive an instruction for safely removing an inserted memory card from a predetermined slot of the electronic device without forcibly disconnecting the memory card from the slot.

Thereafter, the electronic device may identify that the FAT file system using the virtual block device is un-mounted as illustrated in FIG. 2A. Specifically, the electronic device may copy a backup boot record updated and stored in the boot record area 201 of the virtual block device and a FAT table updated and stored in the FAT area 202 of the virtual block device to the boot record area 204 and FAT area 205 of the internal storage respectively, and may copy a data cluster updated and stored in the cluster heap area 203 of the virtual block device to the cluster heap area 208 of the memory card.

Thereafter, the electronic device may copy the backup boot record stored in the boot record area 204 of the internal storage and the FAT table stored in the FAT area 205 to the memory card. Specifically, as shown in FIG. 2B, the electronic device may copy the backup boot record stored in the boot record area 204 of the internal storage and the FAT table stored in the FAT area 205 to the boot record area 206 and cluster heap area 208 of the memory card respectively.

As described above, when the electronic device receives the instruction for safely removing the inserted memory card, the electronic device may copy information updated and stored in the virtual block device to the memory card. Similarly, when the electronic device does not receive the instruction for safely removing the inserted memory card, the electronic device may not copy information updated and stored in the virtual block device to the memory card.

Figure 3A:
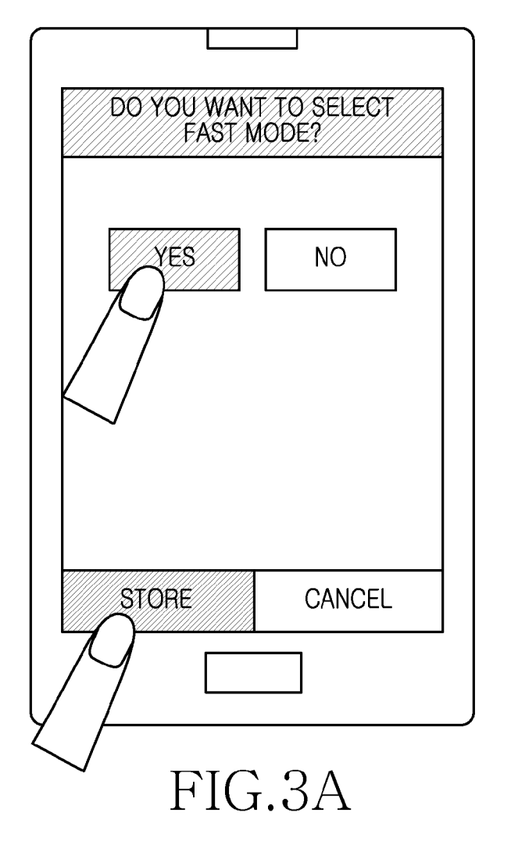
FIG. 3A and FIG. 3B are diagrams illustrating an example in which a fast mode is manually selected in an electronic device, according to aspects of the present disclosure.
Figure 3B:
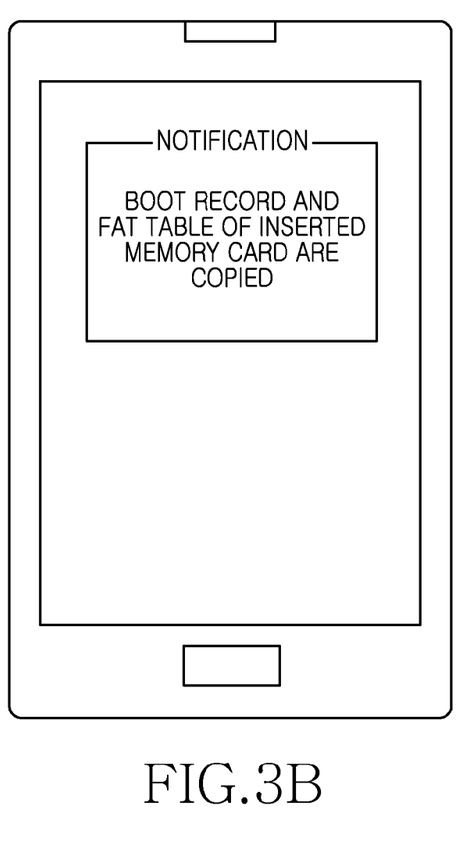

FIGS. 3A and 3B are diagrams illustrating an aspect in which a fast mode is manually selected in an electronic device according to aspects of the present disclosure. First, when the backup boot record is not stored in the boot record area of the internal storage included in the electronic device or the backup boot record is not identical to the boot record stored in the boot record area of the memory card even through the backup boot record is stored, the electronic device may generate a virtual block device through a process which will be described below.

First, the electronic device may determine whether an instruction for performing a fast mode is received. Specifically, the electronic device may display information indicating whether to execute a FAT file system using a virtual block device on the touchscreen of the electronic device and determine whether the instruction for performing the fast mode is received. Herein, the fast mode may be a mode for executing the FAT file system using the generated virtual block device.

As illustrated in FIG. 3A, when the electronic device receives the instruction for executing the FAT file system in the fast mode, the electronic device may determine whether a backup boot record that is different from that of a currently inserted memory card is stored in the boot record area of the internal storage.

Thereafter, when the electronic device identifies that the backup boot record of another memory card is stored in the boot record area of the internal storage, the electronic device may display a notification message on the touchscreen of the electronic device. Specifically, the electronic device may remove the backup boot record of the other memory card stored in the boot record area of the internal storage and display the notification message indicating that the boot record of the currently inserted memory card is to be copied and the FAT table of the currently inserted memory card is to be copied to the FAT area of the internal storage.

Thereafter, the electronic device may copy the boot record stored in the boot record area of the memory card and the FAT table stored in the FAT area of the memory card to the internal storage. That is, the electronic device may copy the boot record stored in the boot record area of the memory card to the boot record area of the internal storage. In addition, the electronic device may copy the FAT table stored in the FAT area of the memory card to the FAT area of the internal storage. Thereafter, the electronic device may mount a FAT file system using the generated virtual block device.

Figure 4A:
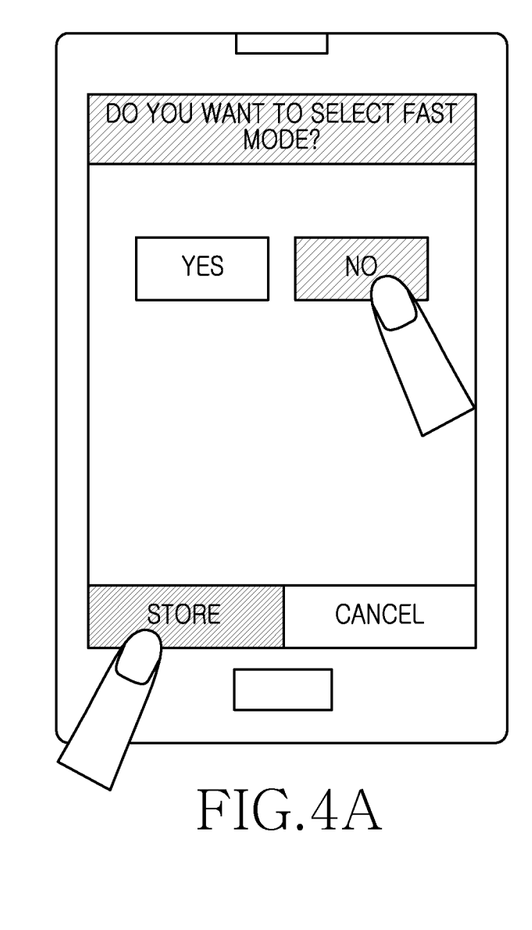
FIG. 4A and FIG. 4B are diagrams illustrating an example in which a normal mode is selected in an electronic device, according to aspects of the present disclosure.
Figure 4B:
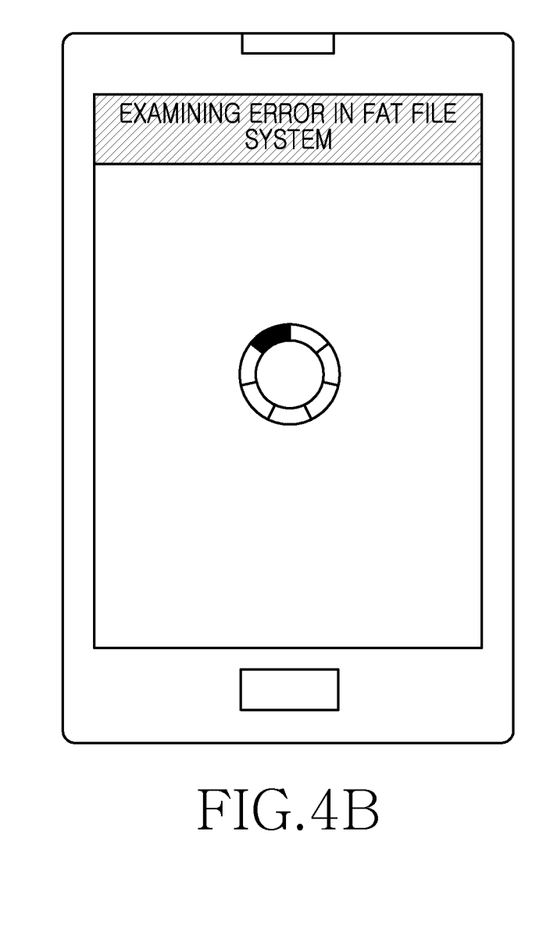

FIGS. 4A and 4B are diagrams illustrating an example in which a normal mode is selected in an electronic device according to aspects of the present disclosure. First, when the backup boot record is not stored in the boot record area of the internal storage included in the electronic device or the backup boot record is not identical to the boot record stored in the boot record area of the memory card even through the backup boot record is stored, the electronic device may execute a FAT file system through a process which will be described below.

First, the electronic device may determine whether an instruction for performing a fast mode is received. Specifically, the electronic device may display information indicating whether to execute a FAT file system using a virtual block device on the touchscreen of the electronic device and determine whether the instruction for performing the fast mode is received.

When the electronic device does not receive the instruction for executing a FAT file system in a fast mode is received as illustrated in FIG. 4A, the electronic device may execute the FAT file system in a normal mode. For example, the normal mode may be a mode for executing the FAT file system without generating a virtual block device.

Thereafter, the electronic device may examine an error in the FAT file system before the execution of the FAT file system using the memory card as illustrated in FIG. 4B. When the electronic device detects an error in the FAT file system, the electronic device may first correct the detected error and then mount the FAT file system using the memory card.

That is, the electronic device according to this example provides two modes, that is, the fast mode and the normal mode and enables the selection of any one of the two modes by a user before mounting the FAT file system.

Figure 5A:
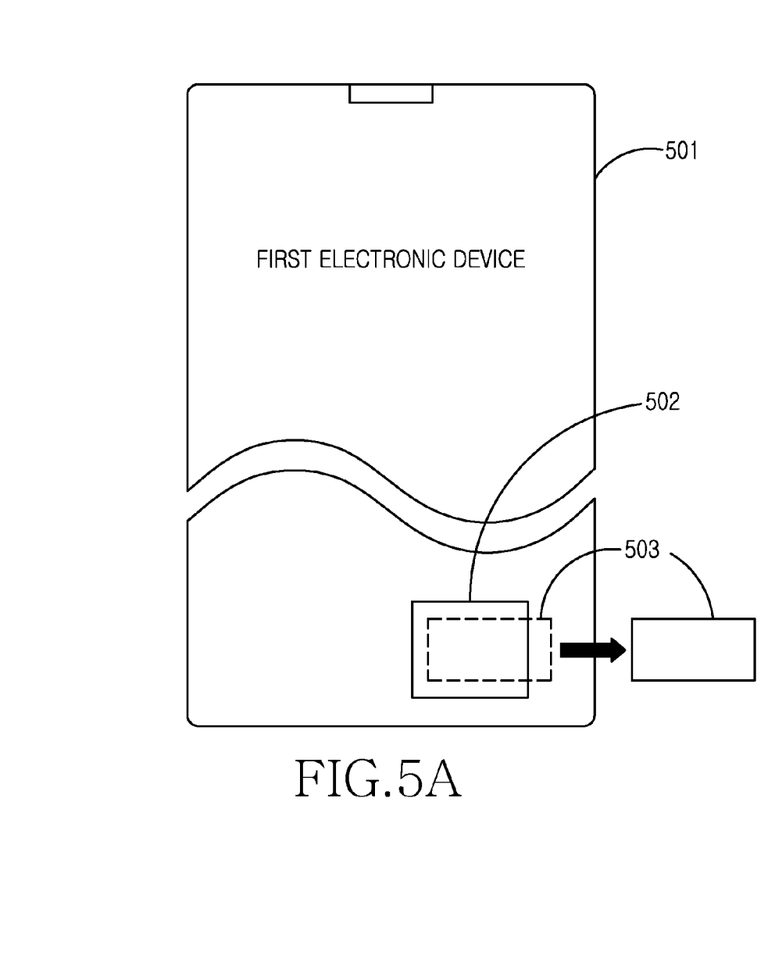
FIG. 5A and FIG. 5B are diagrams illustrating an example of a technique for improving security for a memory card in an electronic device, according to aspects of the present disclosure.
Figure 5B:
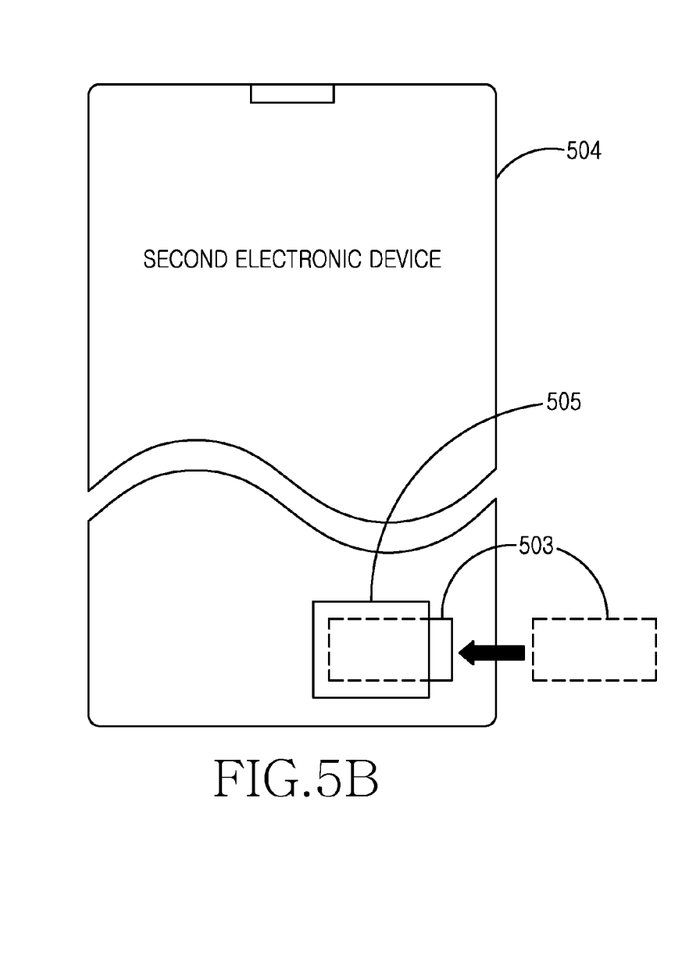

FIGS. 5A and 5B are diagrams illustrating an example of a technique for the improving the security of a memory card in an electronic device according to aspects of the present disclosure. First, referring to FIG. 5A, it is assumed that a memory card 503 is inserted into a slot 502 provided at a predetermined location of a first electronic device 501, a virtual block device is generated, and a FAT file system is executed.

In this example, when the first electronic device 501 mounts the FAT file system using the generated virtual block device, the first electronic device 501 may delete data in the inserted memory card 503. Specifically, when the first electronic device 501 mounts the FAT file system in a fast mode, the first electronic device 501 may delete a boot record stored in the boot record area of the inserted memory card 503 and a FAT table stored in the FAT area of the inserted memory card 503.

When the first electronic device 501 receives an instruction for safely removing the inserted memory card 503, the first electronic device 501 may identify that the FAT file system using the virtual block device is un-mounted. Specifically, the first electronic device 501 may copy the backup boot record updated and stored in the boot record area of the virtual block device and the FAT table updated and stored in the FAT area of the virtual block device to the boot record area and FAT area of an internal storage. In addition, the first electronic device 501 may copy a data cluster updated and stored in the cluster heap area of the virtual block device to the cluster heap area of the memory card 503.

When the first electronic device 501 does not receive the instruction for safely removing the inserted memory card 503, the first electronic device 501 may not identify that the FAT file system using the virtual block device is un-mounted. When the first electronic device 501 does not receive the instruction for safely removing the inserted memory card 503, the first electronic device 501 may not copy information updated and stored in the virtual block device to the memory card 503.

Thereafter, when the memory card 503 separated from the predetermined slot 502 of the first electronic device 501 is inserted into a predetermined slot 505 of a second electronic device 504, the second electronic device 504 may operate differently according to the above-described two cases.

First, when the memory card 503 is safely removed from the first electronic device 501, as shown in FIG. 5B, the second electronic device 504 may execute the FAT file system in the fast mode or normal mode according to whether the memory card 503 is initially inserted or according to a user's selection.

However, when the memory card 503 is not safely removed from the first electronic device 501, the second electronic device 504 may not execute the FAT file system using the inserted memory card 503. The reason for this is that, when the memory card 503 is inserted into the first electronic device 501 and the FAT file system is executed in the fast mode, the boot record stored in the boot record area of the memory card 503 and the FAT table stored in the FAT area of the memory card 503 have been deleted.

Therefore, when the memory card 503 is safely removed from the first electronic device 501, the second electronic device 504 that is another electronic device may generate a virtual block device using the inserted memory card 503 and execute the FAT file system in the fast mode. However, when the memory card 503 is forcibly disconnected from the first electronic device 501 not removed safely, the second electronic device 504 that is another electronic device does not recognize the boot record and FAT table of the inserted memory card 503, thereby ensuring an individual's data privacy.

Figure 6:
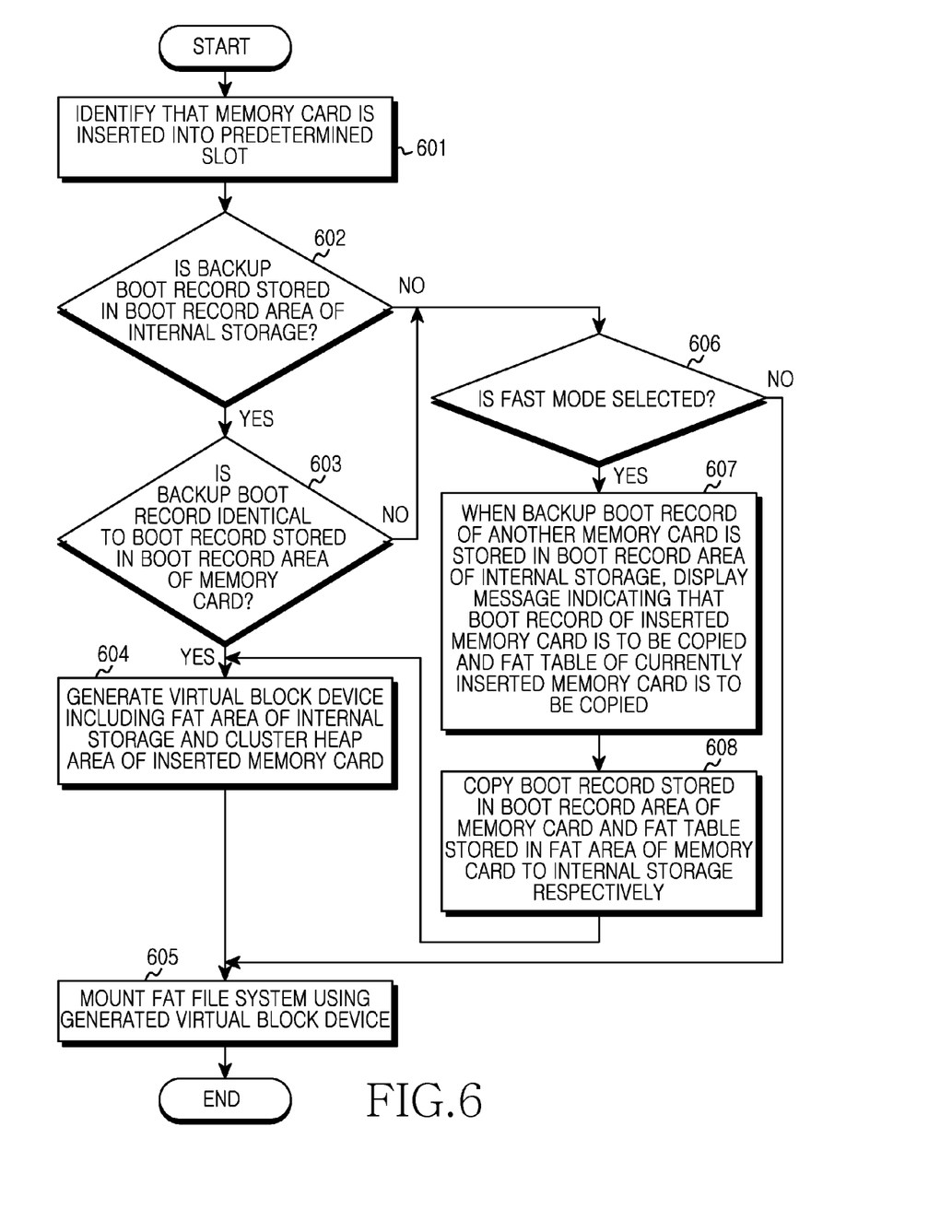
FIG. 6 is a flowchart illustrating an example of a process for mounting a FAT file system in an electronic device, according to aspects of the present disclosure.

FIG. 6 is a flowchart of an example of a process for mounting a FAT file system in an electronic device, according to aspects of the present disclosure. According to the process, in step 601, the electronic device may identify that a memory card is inserted into a predetermined slot. Herein, the electronic device may include at least one slot at a predetermined location. That is, in the electronic device according to the present disclosure, at least one memory card may be inserted to at least one slot provided at a predetermined location of the electronic device.

In step 602, the electronic device may determine whether a backup boot record is stored in the boot record area of an internal storage. Specifically, the electronic device may determine whether the boot record of the memory card is baked up in the boot record area of the internal storage to determine whether the memory card had been inserted previously. When the memory card is inserted into the predetermined slot of the electronic device, the electronic device backs up the boot record of the inserted memory card to store the backup boot record in the boot record area of the internal storage of the electronic device.

When the electronic device determines that the backup boot record is stored in the boot record area of the internal storage in the above-described determination step 602, the electronic device may determine whether the backup boot record is identical to the boot record stored in the boot record area of the memory card in step 603. Specifically, the electronic device may determine whether the backup boot record is identical to the boot record stored in the boot record area of the memory card to determine whether the memory card that is currently inserted had been inserted previously.

When the electronic device determines that the backup boot record is identical to the boot record stored in the boot record area of the memory card in the above-described determination step 603, the electronic device may generate a virtual block device including the FAT area of the internal storage and the cluster heap area of the inserted memory card in step 604. Specifically, the boot record area and FAT area of the virtual device may be areas which have been synchronized with the boot record area and FAT area of the internal storage respectively, and the cluster heap area of the virtual device may be an area which has been synchronized with the cluster heap area of the memory card.

In step 605, the electronic device may mount a FAT file system using the generated virtual block device. That is, the boot record area and FAT area of the virtual block device may operate under the control of the internal storage included in the electronic device. Thereafter, the FAT file system may be managed in which the FAT area of the generated virtual block device reads data from the cluster heap area of the virtual block device and stores data in the cluster heap area.

When the electronic device determines that the backup boot record is not stored in the boot record area of the internal storage or that the backup boot record is not identical to the boot record stored in the boot record area of the memory card, the electronic device may determine whether a fast mode is selected in step 606. For example, the fast mode may be a mode for executing the FAT file system using the generated virtual block device.

In instances in which the electronic device determines that the fast mode is not selected in the above-described determination step 606, when the backup boot record of another memory card is stored in the boot record area of the internal storage, the electronic device may display a message indicating that the boot record of the inserted memory card is to be copied and the FAT table of the currently inserted memory card is to be copied in step 607. Specifically, the electronic device may remove the backup boot record of the other memory card stored in the boot record area of the internal storage and display the notification message indicating that the boot record of the currently inserted memory card is to be copied and that the FAT table of the currently inserted memory card is to be copied to the FAT area of the internal storage.

In step 608, the electronic device may copy the boot record stored in the boot record area of the memory card and the FAT table stored in the FAT area of the memory card to the internal storage respectively. Specifically, the electronic device may copy the boot record stored in the boot record area of the memory card and the FAT table stored in the FAT area of the memory card to the boot record area and FAT area of the internal storage respectively.

Thereafter, the process may proceed to step 604.

When the electronic device determines that the fast mode it not selected in the above-described determination step 606, the process may proceed to step 605.

Figure 7:
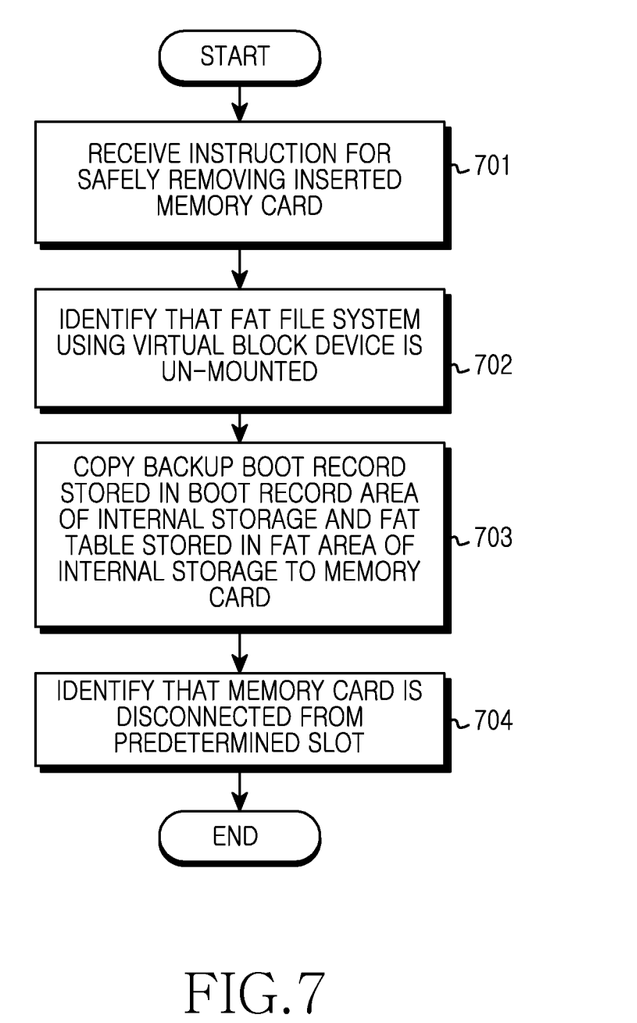
FIG. 7 is a flowchart illustrating an example of a process for un-mounting a FAT file system in an electronic device, according to aspects of the present disclosure.

FIG. 7 is a flowchart of an example of a process for un-mounting a FAT file system, according to aspects of the present disclosure. According to the process, in step 701, the electronic device may receive an instruction for safely removing an inserted memory card. Specifically, the electronic device may receive the instruction for safely removing the inserted memory card. For example, the memory card may be considered may be considered safely removed when the memory card is not forcibly disconnected before confirming memory card has been un-mounted.

In step 702, the electronic device may identify that a FAT file system using a virtual block device is un-mounted. Specifically, the first electronic device may copy the backup boot record updated and stored in the boot record area of the virtual block device and the FAT table updated and stored in the FAT area of the virtual block device to the boot record area and FAT area of an internal storage, respectively. In addition, the first electronic device may copy a data cluster updated and stored in the cluster heap area of the virtual block device to the cluster heap area of the memory card.

In step 703, the electronic device may copy the backup boot record stored in the boot record area of the internal storage and the FAT table stored in the FAT area of the internal storage to the memory card. Specifically, when the electronic device receives the instruction for safely removing the memory card, the electronic device synchronizes the internal storage with the memory card, thereby allowing the memory card to be used in another electronic device after removal of the memory card from the electronic device.

In step 704, the electronic device may identify that the memory card is disconnected from the predetermined slot.

Figure 8:
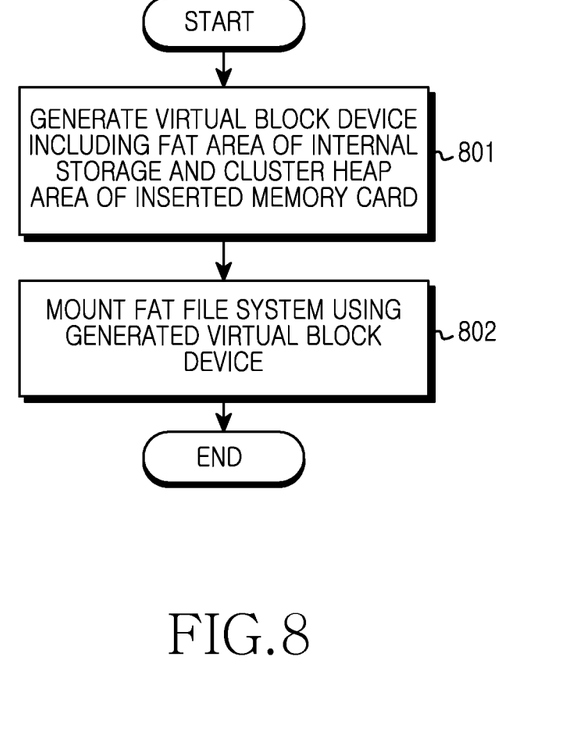
FIG. 8 is a flowchart illustrating an example of a process for mounting a file system using a virtual block device in an electronic device, according to aspects of the present disclosure.

FIG. 8 is a flowchart of an example of a process for mounting a file system using a virtual block device in an electronic device, according to aspects of the present disclosure. According to the process, in step 801, the electronic device may generate a virtual block device including a FAT area located on an internal storage and a cluster heap area located on a memory card. Specifically, the electronic device may generate the FAT area of the virtual device from the FAT area of the internal storage and generate the cluster heap area of the virtual device from the cluster heap area of the memory card. That is, the boot record area and FAT area of the virtual device may be areas which have been synchronized with the boot record area and FAT area of the internal storage respectively, and the cluster heap area of the virtual device may be an area which has been synchronized with the cluster heap area of the memory card.

In step 802, the electronic device may mount a FAT file system using the generated virtual block device. Specifically, the electronic device may copy a backup boot record updated and stored in the boot record area of the virtual block device and a FAT table updated and stored in the FAT area of the virtual block device to the boot record area and FAT area of the internal storage respectively, and may copy a data cluster updated and stored in the cluster heap area of the virtual block device to the cluster heap area of the memory card.

Figure 9:
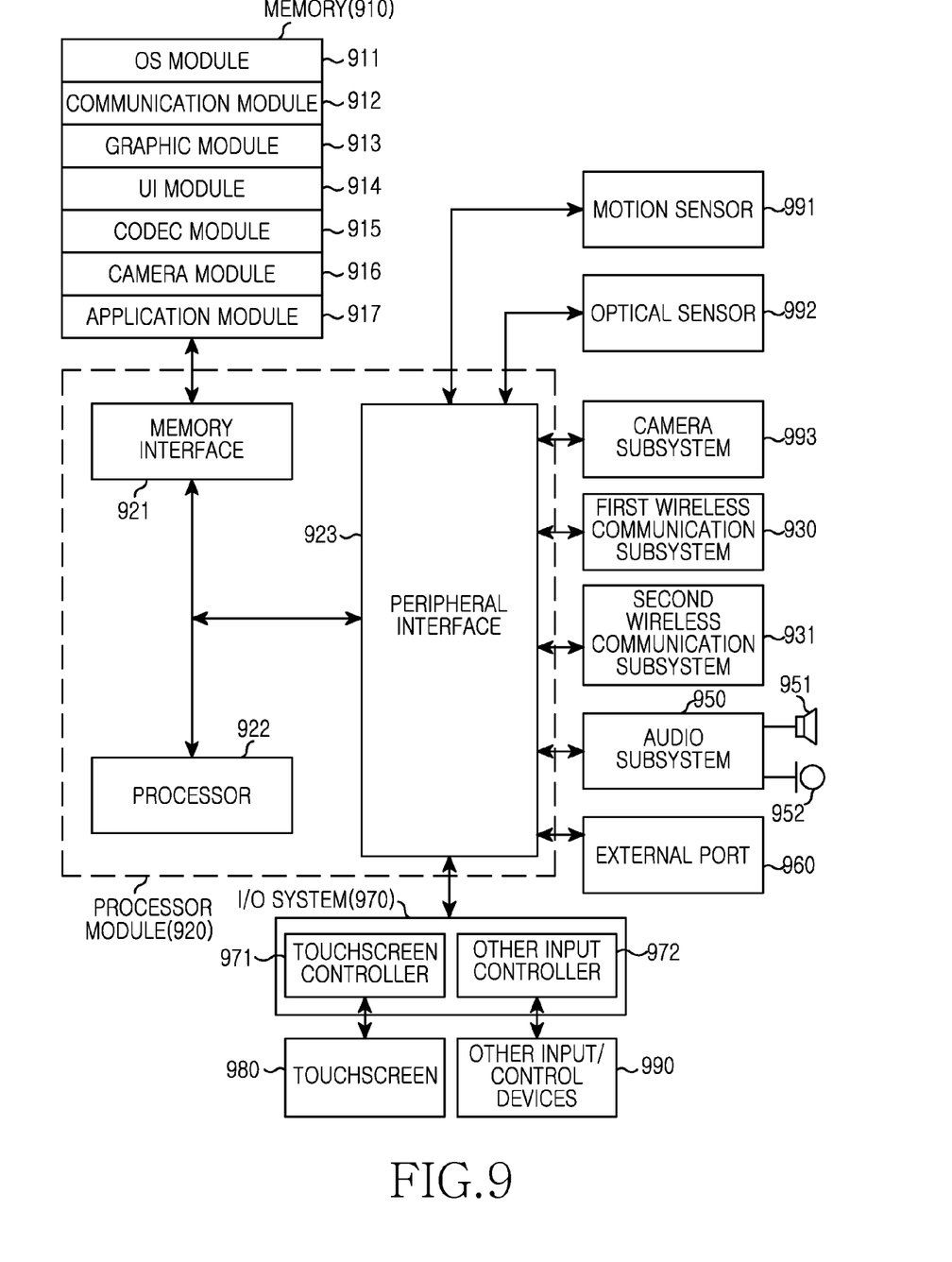
FIG. 9 is a block diagram illustrating an example of a configuration of an electronic device, according to aspects of the present disclosure.

FIG. 9 is a block diagram illustrating an example of a configuration of an electronic device, according to aspects of the present disclosure. Such an electronic device 900 may be a portable electronic device, and examples thereof may include a portable terminal, a mobile phone, a mobile pad, a media player, a tablet computer, a handheld computer, or a Personal Digital Assistant (PDA). In addition, the electronic device may be any one portable electronic device including a device having two or more functions among the above-described devices.

The electronic device 900 includes a memory 910, a processor module 920, a first wireless communication subsystem 930, a second wireless communication subsystem 931, an external port 960, an audio subsystem 950, a speaker 951, a microphone 952, an input/output (I/O) system 970, a touchscreen 980, and other input/control devices 990. The memory unit 910 and the external port 960 may be provided in plurality.

The processor module 920 may include a memory interface 921, at least one processor 922, and a peripheral interface 923. In some cases, the processor module 920 will also be referred to as a processor. According to the present disclosure, the processor module 920 may generate a virtual block device including a FAT area of an internal storage and a cluster heap area of an inserted memory card and mount a FAT file system using the generated virtual block device. In addition, the processor module 920 may determine whether a backup boot record is stored in the boot record area of the internal storage, and determine whether the backup boot record is identical to a boot record stored in the boot record area of the inserted memory card when the backup boot record is stored. Therefore, the processor module 920 may identify that the backup boot record stored in the boot record area of the internal storage is identical to the boot record stored in the boot record area of the memory card. In addition, the processor module 920 may examine an error in the FAT file system before executing the FAT file system using the virtual block device. When the processor module 920 detects an error in the FAT file system, the processor module 920 may correct the detected error and mount the FAT file system using the virtual block device. The processor module 920 may delete the boot record stored in the boot record area of the inserted memory card and the FAT table stored in the FAT area of the inserted memory card. In addition, the processor module 920 may read or store data from or in the cluster heap area of the virtual block device by the FAT area of the generated virtual block device. The processor module 920 may identify that the backup boot record is not stored in the boot record area of the internal storage or that the backup boot record is not identical to the boot record stored in the boot record area of the memory card. The processor module 920 may determine whether an instruction for executing the FAT file system using the generated virtual block device and, when the instruction is received, copy a boot record stored in the boot record area of the memory card and a FAT table stored in the FAT area of the memory card to the internal storage respectively. In this case, the processor module 920 may identify that the backup boot record obtained when the boot record of the memory card is backed up is stored in the boot record area of the internal storage and identify that the FAT table of the memory card is stored in the FAT area of the internal storage. The processor module 920 may identify that the backup boot record of another memory card is stored in the boot record area of the internal storage and, when the instruction is not received, examine an error in the FAT file system before executing the FAT file system using the memory card. In this case, when an error in the FAT file system is detected, the processor module 920 may correct the error and mount the FAT file system using the memory card. The processor module 920 may identify that the FAT file system using the virtual block device is un-mounted, copy the backup boot record stored in the boot record area of the internal storage and the FAT table stored in the FAT area of the internal storage to the boot record area and FAT area of the memory card respectively, and identify that the memory card is disconnected from the predetermined slot. Specifically, the processor module 920 may copy a backup boot record updated and stored in the boot record area of the virtual block device and a FAT table updated and stored in the FAT area of the virtual block device to the boot record area and FAT area of the internal storage respectively, and may copy a data cluster updated and stored in the cluster heap area of the virtual block device to the cluster heap area of the memory card.

The processor module 920 executes various software programs to perform various functions for the electronic device 900, and performs processes and controls for voice communication and data communication. In addition to these general functions, the processor 922 executes a specific software module (instruction set) stored in the memory 910 and performs various specific functions corresponding to the software module. That is, the processor 922 performs methods according to aspects of the present disclosure in cooperation with software modules stored in the memory 910.

The processor 922 may include one or more of data processor, image processor, codec, and/or any other suitable type of processing circuitry. One or more of the data processor, the image processor, or the codec may be configured separately or integrated together. In addition, the processor 922 may be configured by a plurality of processors performing different functions. The peripheral interface 923 connects various peripheral devices and the I/O subsystem 970 of the electronic device 900 to the processor 922 and the memory 910 (through the memory interface).

The various elements of the electronic device 900 may be coupled by at least one communication bus (not illustrated) or stream line (not illustrated).

The external port 960 is used to connect a portable electronic device (not illustrated) to other electronic devices directly or indirectly through a network (for example, Internet, Intranet, or wireless LAN). The external port 960 may be, for example, a universal serial bus (USB) port or a FireWire port, but is not limited thereto.

A motion sensor 991 and an optical sensor 992 may be connected to the peripheral interface 923 to enable various functions. For example, the motion sensor 991 and the optical sensor 992 may be connected to the peripheral interface 923 to detect a motion of the electronic device and detect light from the outside. In addition, other sensors, such as a positioning system, a temperature sensor, and a biosensor, may be connected to the peripheral interface 923 to perform relevant functions.

A camera subsystem 993 may perform camera functions such as photographing and video clip recording.

The optical sensor 992 may include a CCD (charged coupled device) or a CMOS (complementary metal-oxide semiconductor) device.

A communication function is performed through one or more wireless communication subsystems 930 and 931. The wireless communication subsystems 930 and 931 may include a radio frequency (RF) receiver and transceiver and/or an optical (e.g., infrared) receiver and transceiver. The first wireless communication subsystem 930 and the second wireless communication subsystem 931 may be divided according to communication networks through which the electronic device 900 performs communication. For example, the communication networks may include, but not limited to, a GSM (Global System for Mobile Communication) network, an EDGE (Enhanced Data GSM Environment) network, a CDMA (Code Division Multiple Access) network, a W-CDMA (W-Code Division Multiple Access) network, an LTE (Long Term Evolution) network, an OFDMA (Orthogonal Frequency Division Multiple Access) network, a WiFi (Wireless Fidelity) network, a WiMax network, and/or a Bluetooth network. The first wireless communication subsystem 930 and the second wireless communication subsystem 931 may be integrated with each other as one wireless communication subsystem.

The audio subsystem 950 is connected to the speaker 951 and the microphone 952 to perform audio stream input/output functions such as voice recognition, voice replication, digital recording, and telephone functions. That is, the audio subsystem 950 communicates with the user through the speaker 951 and the microphone 952. The audio subsystem 950 receives a data stream through the peripheral interface 923 of the processor module 920 and converts the received data stream into an electric stream. The electric stream is transmitted to the speaker 951. The speaker 951 converts the electric stream into sound waves audible by humans and outputs the same. The microphone 952 converts sound waves received from humans or other sound sources into an electric stream. The audio subsystem 950 receives the electric stream from the microphone 952. The audio subsystem 950 converts the received electric stream into an audio data stream and transmits the audio data stream to the peripheral interface 923. The audio subsystem 950 may include an attachable/detachable earphone, a headphone, or a headset.

The I/O subsystem 970 may include a touchscreen controller 971 and/or another input controller 972. The touchscreen controller 971 may be connected to the touchscreen 980. The touchscreen 980 and the touchscreen controller 971 may detect a touch, a motion, or a stop thereof by using multi-touch detection technologies including, but not limited to, a proximity sensor array or other elements, as well as capacitive, resistive, infrared and surface acoustic wave technologies for determining one or more touch points on the touchscreen 980. The other input controller 972 may be connected to the other input/control devices 990. The other input/control device 990 may include one or more buttons, a rocker switch, a thumb wheel, a dial, a stick, and/or a pointer device such as a stylus.

The touchscreen 980 provides an I/O interface between the electronic device 900 and the user. That is, the touchscreen 980 transmits a user touch input to the electronic device 900. Also, the touchscreen 980 is a medium that displays an output from the electronic device 900 to the user. That is, the touchscreen 980 displays a visual output to the user. The visual output may be represented by a text, a graphic, a video, or a combination thereof.

The touchscreen 980 may use various display technologies. For example, the touchscreen 980 may use, but is not limited to, an LCD (liquid crystal display), an LED (Light Emitting Diode), an LPD (light emitting polymer display), an OLED (Organic Light Emitting Diode), an AMOLED (Active Matrix Organic Light Emitting Diode), or an FLED (Flexible LED). The touchscreen 980 of the present disclosure may display a notification message indicating that the stored backup boot record of another memory card is to be deleted and the boot record of the currently inserted memory card is to be copied and that the FAT table of the currently inserted memory card is to be copied. In addition, the touchscreen 980 may receive an instruction for safely removing an inserted memory card.

The memory 910 may be connected to the memory interface 921. The memory unit 910 may include one or more high-speed random-access memories (RAMs) such as magnetic disk storage devices, one more nonvolatile memories, one or more optical storage devices, and/or one or more flash memories (for example, NAND flash memories or NOR flash memories).

The memory 910 stores software. Software components include an operation system (OS) module 911, a communication module 912, a graphic module 913, a user interface (UI) module 914, a codec module 915, a camera module 916, and one or more application modules 917. Also, since the module that is a software component may be represented as a set of instructions, the module may be referred to as an instruction set. The module may also be referred to as a program. The OS software 911 (for example, WINDOWS, LINUX, Darwin, RTXC, UNIX, OS X, or an embedded OS such as VxWorks) includes various software components for controlling general system operations. For example, general system operation controls may include memory control/management, storage hardware (device) control/management, and power control/management. The OS software also performs a function for enabling smooth communication between various hardware components (devices) and software components (modules).

The communication module 912 may enable communication with other electronic devices (such as computers, servers, and/or portable terminals) through the wireless communication subsystems 930 and 931 or the external port 960.

The graphic module 913 includes various software components for providing and displaying graphics on the touchscreen 980. The graphics include texts, web pages, icons, digital images, videos, and animations.

The UI module 914 includes various software components related to an user interface. Through the user interface module, the electronic device provides information about how the state of the user interface changes and/or information about under what condition the state of the user interface changes.

The codec module 915 may include software components related to video file encoding/decoding. The codec module may include a video stream module such as an MPEG module or an H204 module. Also, the codec module may include various audio file codec modules such as AAA, AMR, and WMA. Also, the codec module 915 includes an instruction set corresponding to implementation methods of the present disclosure.

The camera module 916 may include camera-related software components that enable camera-related processes and functions.

The application module 917 includes a browser application, an e-mail application, an instant message application, a word processing application, a keyboard emulation application, an address book application, a touch list application, a widget application, a digital right management (DRM) application, a voice recognition application, a voice replication application, a position determining function application, a location-based service (LBS) application, and the like.

In addition, various functions of the electronic device 900 according to the present disclosure as described above and as described below may be implemented by hardware and/or software including one or more stream processing and/or an application-specific integrated circuit (ASIC) and/or a combination thereof.

While the disclosure has been shown and described with reference to certain exemplary aspects thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

The processes provided with respect to FIGS. 6-8 are provided as examples only. Any of the steps in these processes may be performed concurrently, in a different order, or altogether omitted.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

What is claimed is:

1. A method in an electronic device, comprising:
    detecting, by a processor, whether a backup boot record is present in a boot record area of an internal storage of the electronic device and identical to a boot record stored in a boot record area of a memory card inserted into the electronic device;
    when the backup boot record is present and identical, generating a virtual block device in the internal storage by synchronizing a boot record area of the virtual block device with the boot record area of the internal storage and synchronizing a file allocation table (FAT) area of the virtual block device with a FAT area of the internal device, and synchronizing a cluster heap area of the virtual block device with a cluster heap area of the memory card;
    when the backup boot record is absent or nonidentical, generating the virtual block device by copying the boot record stored in the boot record area of the memory card to the boot record area of the internal storage and copying a FAT of the memory card to the FAT area of the internal storage; and
    mounting a file system of the memory card using the generated virtual block device.

2. The method of claim 1, wherein mounting the file system using the generated virtual block device comprises:
    detecting whether an error is present in the file system before the file system is mounted; and
    when the error is detected, correcting the error before the file system is mounted.

3. The method of claim 1, further comprising deleting the boot record stored in a boot record area of the inserted memory card and the FAT stored in a FAT area of the inserted memory card, responsive to mounting the file system of the memory card using the generated virtual block device.

4. The method of claim 1, further comprising reading or changing, data from or in the FAT area of the virtual block device, data from or in the cluster heap area of the virtual block device.

5. The method of claim 1, further comprising:
detecting that a backup boot record of another memory card is stored in the boot record area of the internal storage; and
outputting an indication that the backup boot record of the other memory card is to be deleted.

6. The method of claim 1, further comprising:
when an instruction for mounting the file system of the memory card using the generated virtual block device is not received, detecting an error in the file system before the file system is mounted; and
when the error is detected, correcting the error before mounting the file system.

7. The method of claim 1, further comprising:
receiving an instruction for safely removing the inserted memory card;
identifying that a FAT file system using the virtual block device is unmounted;
copying the backup boot record stored in the boot record area of the internal storage and the FAT stored in the file allocation table area of the internal storage to the boot record area of the memory card and a FAT area of the memory card, respectively; and
identifying that the inserted memory card is removed from a slot in which the memory card is inserted.

8. The method of claim 7, unmounting the file system comprises:
copying a backup boot record updated and stored in the boot record area of the virtual block device and a FAT updated and stored in the FAT area of the virtual block device to the boot record area and FAT area of the internal storage respectively; and
copying a data cluster updated and stored in the cluster heap area of the virtual block device to the cluster heap area of the memory card.

9. The method of claim 1, further comprising:
after detecting that the backup boot record is absent or nonidentical, displaying a first icon selectable to execute a fast mode and a second icon selectable to execute a normal mode;
when the first icon is selected, executing generating of the virtual block device in the fast mode by copying the boot record stored in the boot record area of the memory card to the boot record area of the internal storage and copying a FAT of the memory card to the FAT area of the internal storage; and
when the second icon is selected executing a FAT file system in the normal mode without generating a virtual block device.

10. An electronic device comprising:
an internal storage; and
a processing circuitry configured to:
detect whether a backup boot record is present in a boot record area of an internal storage of the electronic device and identical to a boot record stored in a boot record area of a memory card inserted into the electronic device;
when the backup boot record is present and identical, generate a virtual block device in the internal storage by synchronizing a boot record area of the virtual block device with the boot record area of the internal storage and synchronizing a file allocation table (FAT) area of the virtual block device with a FAT area of the internal storage, and synchronizing a cluster heap area of the virtual block device with a cluster heap area of the memory card; and
mount a file system of the memory card using the generated virtual block device.

11. The electronic device of claim 10, wherein mounting the file system using the generated virtual block device comprises:
detecting whether an error is present in the file system before the file system is mounted; and
when the error is detected, correcting the error before the file system is mounted.

12. The electronic device of claim 10, wherein the processing circuitry is further configured to delete the boot record stored in a boot record area of the inserted memory card and the FAT stored in a FAT area of the inserted memory card, responsive to mounting the file system of the memory card using the generated virtual block device.

13. The electronic device of claim 10, wherein the processing circuitry is further configured to read or change, data from or in the FAT area of the virtual block device, data from or in the cluster heap area of the virtual block device.

14. The electronic device of claim 10, wherein the processing circuitry is further configured to:
detect that a backup boot record of another memory card is stored in the boot record area of the internal storage; and
output an indication that the backup boot record of the other memory card is to be deleted.

15. The electronic device of claim 10, wherein the processing circuitry is further configured to:
when an instruction for mounting the file system of the memory card using the generated virtual block device is not received, detect an error in the file system before the file system is mounted; and
when the error is detected, correct the error before mounting the file system.

16. The electronic device of claim 10, wherein the processing circuitry is further configured to:
receive an instruction for safely removing the inserted memory card;
identify that a FAT file system using the virtual block device is unmounted;
copy the backup boot record stored in the boot record area of the internal storage and the FAT stored in the FAT area of the internal storage to the boot record area of the memory card and a FAT area of the memory card, respectively; and
identify that the inserted memory card is removed from a slot in which the memory card is inserted.

17. The electronic device of claim 16, wherein the processing circuitry copies a backup boot record updated and stored in the boot record area of the virtual block device and a FAT updated and stored in the FAT area of the virtual block device to the boot record area and FAT area of the internal storage respectively, and copies a data cluster updated and stored in the cluster heap area of to the cluster heap area of the memory card.

18. The electronic device of claim 10, wherein the processing circuitry is further configured to:
after detecting that the backup boot record is absent or nonidentical, control a display to display a first icon selectable to execute a fast mode and a second icon selectable to execute a normal mode, when the first icon is selected, execute generating of the virtual block device in the fast mode by copying the boot record stored in the boot record area of the memory card to the boot record area of the internal storage and copying a FAT of the memory card to the FAT area of the internal storage, and when the second icon is selected, execute a FAT file system in the normal mode without generating a virtual block device.

* * * * *